(12) United States Patent
Teraoka

(10) Patent No.: US 11,164,398 B2
(45) Date of Patent: Nov. 2, 2021

(54) SOFTWARE MANAGEMENT SYSTEM, GATEWAY DEVICE, MAINTENANCE DEVICE, SERVER DEVICE, AND CONTROL METHOD FOR SOFTWARE MANAGEMENT SYSTEM

(71) Applicant: Hitachi, Ltd., Tokyo (JP)

(72) Inventor: Hidetoshi Teraoka, Tokyo (JP)

(73) Assignee: Hitachi, Ltd., Tokyo (JP)

(*) Notice: Subject to any disclaimer, the term of this patent is extended or adjusted under 35 U.S.C. 154(b) by 107 days.

(21) Appl. No.: 16/384,682

(22) Filed: Apr. 15, 2019

(65) Prior Publication Data
US 2019/0325666 A1 Oct. 24, 2019

(30) Foreign Application Priority Data

Apr. 18, 2018 (JP) .............................. JP2018-079548

(51) Int. Cl.
*G07C 5/00* (2006.01)
*G06F 8/71* (2018.01)
*G07C 5/08* (2006.01)

(52) U.S. Cl.
CPC .............. *G07C 5/008* (2013.01); *G06F 8/71* (2013.01); *G07C 5/0808* (2013.01)

(58) Field of Classification Search
CPC .. G06F 8/65; G06F 8/71; G07C 5/008; G07C 5/0808; H04L 12/4625; H04L 2012/40267;

(Continued)

(56) References Cited

U.S. PATENT DOCUMENTS 8,762,059 B1* 6/2014 Balogh .................. G01C 21/00
701/533
9,465,953 B2* 10/2016 Sharma .................. G06F 21/60
(Continued)

FOREIGN PATENT DOCUMENTS

JP 2010-273181 A 12/2010
JP 2017-059210 A 3/2017

OTHER PUBLICATIONS

Extended European Search Report for related European Patent Application No. 19169425.6, dated Jul. 16, 2019; 12 pages.

*Primary Examiner* — Behrang Badii
*Assistant Examiner* — Daniel L Greene
(74) *Attorney, Agent, or Firm* — Procopio, Cory, Hargreaves & Savitch LLP

(57) ABSTRACT

A software management system includes a server device, a maintenance device communicating with the server device, an electronic control device provided in a vehicle, a communication device provided in the vehicle, and a gateway device provided in the vehicle and communicating with the maintenance device, the electronic control device, and the communication device. The server device manages version information of software of the electronic control device in association with a control device ID of the electronic control device and the gateway device stores a correspondence between the control device ID and a communication ID of the electronic control device, and further the maintenance device instructs the gateway device to set the correspondence between the control device ID and the communication ID. The gateway device acquires the version information from the electronic control device and notifies the server device of configuration information associating the version information and the control device ID.

11 Claims, 11 Drawing Sheets

(58) Field of Classification Search
CPC ........... H04L 2012/40273; H04L 67/12; H04L 12/40
See application file for complete search history.

(56) References Cited

U.S. PATENT DOCUMENTS

| | | | |
|---|---|---|---|
| 2008/0028080 A1* | 1/2008 | Ashida | G05B 19/0421 709/228 |
| 2010/0192207 A1* | 7/2010 | Raleigh | G06Q 30/04 726/6 |
| 2010/0223382 A1* | 9/2010 | Rayes | H04L 41/0856 709/225 |
| 2012/0089845 A1* | 4/2012 | Raleigh | H04L 41/5045 713/176 |
| 2016/0063191 A1* | 3/2016 | Vesto | G16H 50/50 705/2 |
| 2016/0308822 A1 | 10/2016 | Chae et al. | |
| 2016/0327612 A1* | 11/2016 | Terada | G01R 31/382 |
| 2018/0018160 A1 | 1/2018 | Teraoka et al. | |

\* cited by examiner

FIG. 10

PART INFORMATION TBL 131

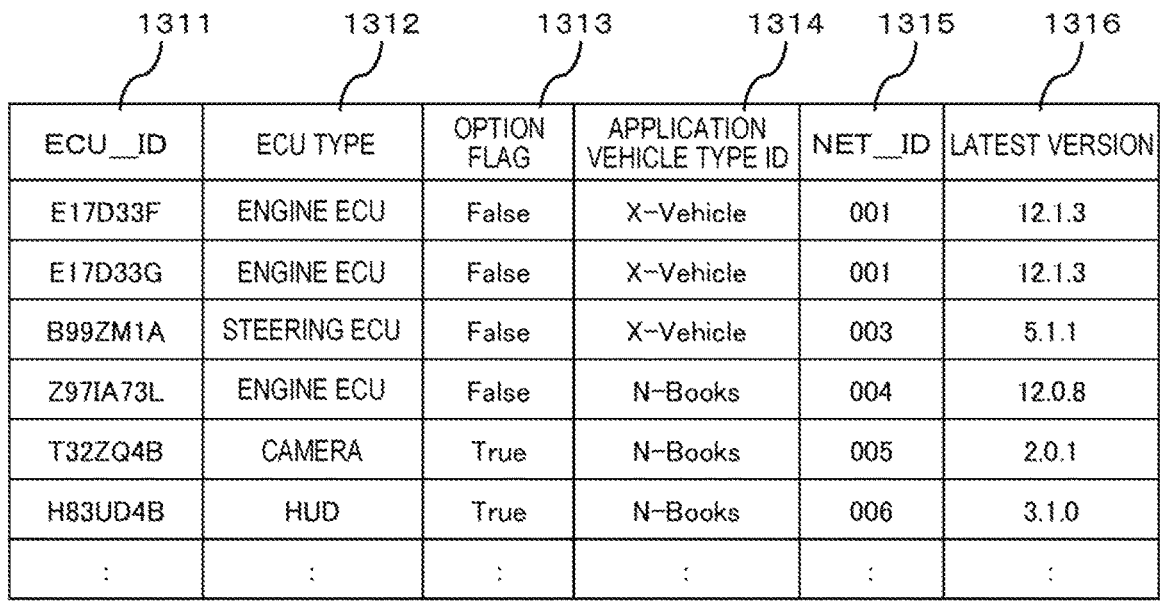

| ECU_ID | ECU TYPE | OPTION FLAG | APPLICATION VEHICLE TYPE ID | NET_ID | LATEST VERSION |
|---|---|---|---|---|---|
| E17D33F | ENGINE ECU | False | X-Vehicle | 001 | 12.1.3 |
| E17D33G | ENGINE ECU | False | X-Vehicle | 001 | 12.1.3 |
| B99ZM1A | STEERING ECU | False | X-Vehicle | 003 | 5.1.1 |
| Z97IA73L | ENGINE ECU | False | N-Books | 004 | 12.0.8 |
| T32ZQ4B | CAMERA | True | N-Books | 005 | 2.0.1 |
| H83UD4B | HUD | True | N-Books | 006 | 3.1.0 |
| : | : | : | : | : | : |

FIG. 11

ADDITIONAL PART INFORMATION TBL 132

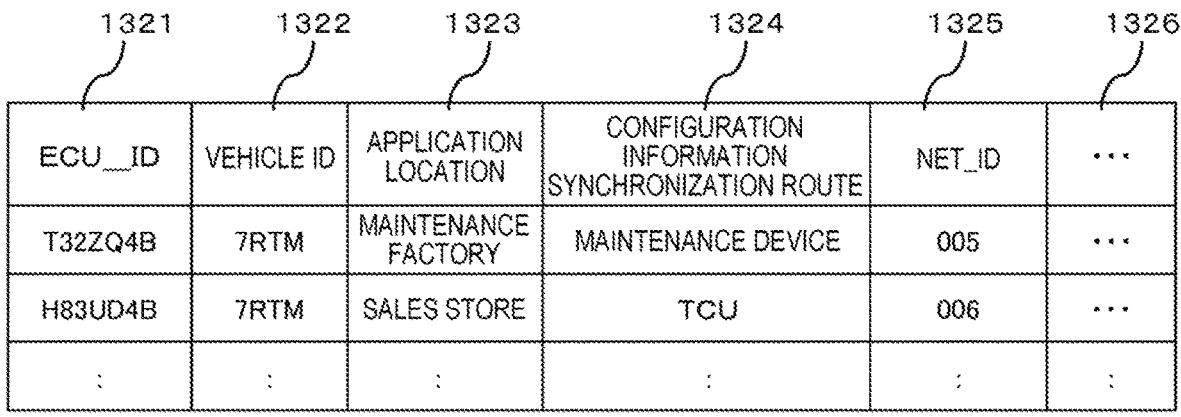

| ECU_ID | VEHICLE ID | APPLICATION LOCATION | CONFIGURATION INFORMATION SYNCHRONIZATION ROUTE | NET_ID | ... |
|---|---|---|---|---|---|
| T32ZQ4B | 7RTM | MAINTENANCE FACTORY | MAINTENANCE DEVICE | 005 | ... |
| H83UD4B | 7RTM | SALES STORE | TCU | 006 | ... |
| : | : | : | : | : | : |

FIG. 12
VEHICLE CONFIGURATION INFORMATION TBL133
| VEHICLE ID | VEHICLE TYPE ID | ECU TYPE | ECU_ID | CURRENT VERSION INFORMATION |
|---|---|---|---|---|
| 9GJH | X-Vehicle | ENGINE ECU | E17D33F | 12.1.3 |
| 9GJH | X-Vehicle | STEERING ECU | B99ZM1A | 5.1.1 |
| 7RTM | N-Books | ENGINE ECU | Z97IA73L | 12.0.8 |
| ⋮ | ⋮ | ⋮ | ⋮ | ⋮ |
FIG. 13
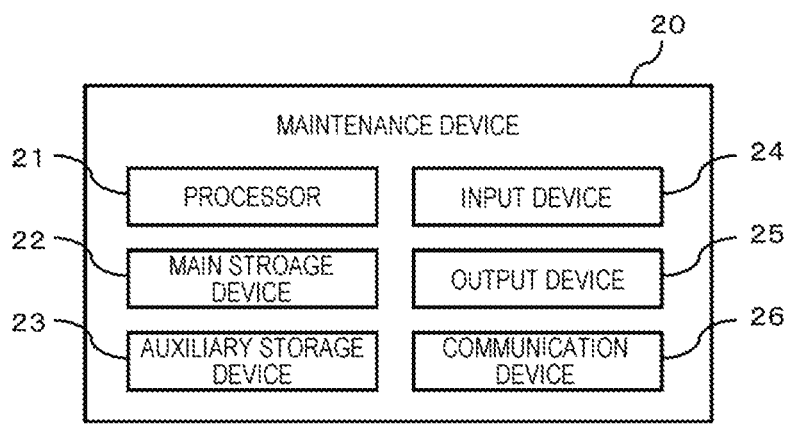
FIG. 14
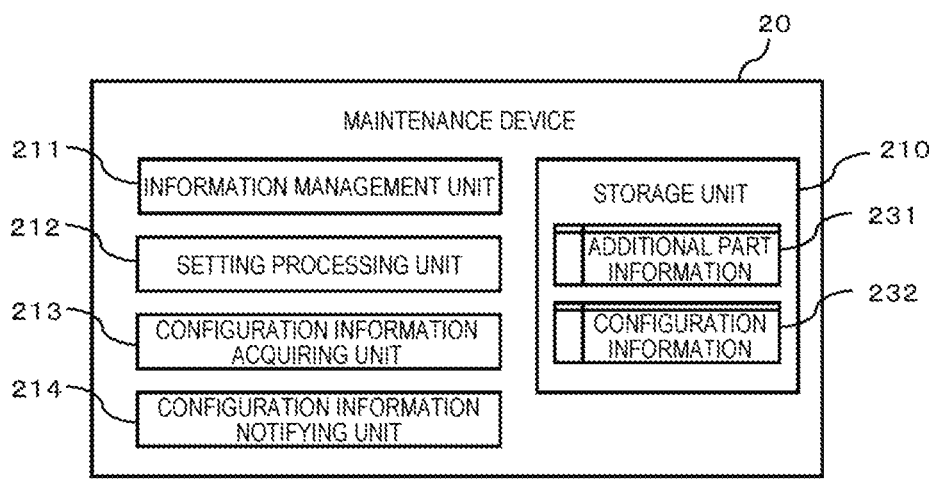

ADDITIONAL PART INFORMATION 231

CONFIGURATION INFORMATION PROVISION REQUEST 1800

CONFIGURATION INFORMATION 232

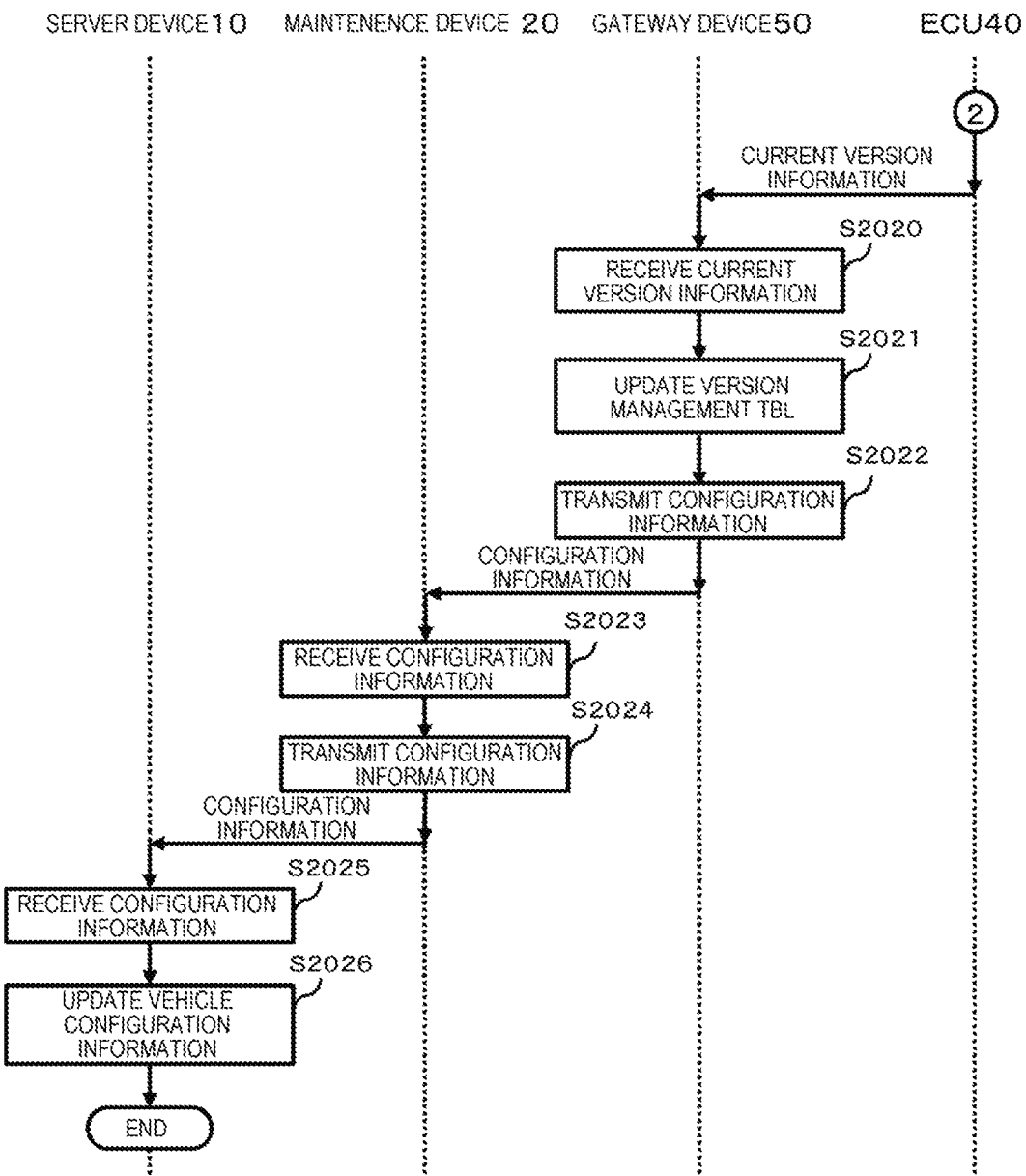

SOFTWARE MANAGEMENT SYSTEM, GATEWAY DEVICE, MAINTENANCE DEVICE, SERVER DEVICE, AND CONTROL METHOD FOR SOFTWARE MANAGEMENT SYSTEM

CROSS-REFERENCE TO RELATED APPLICATION

This application claims priority pursuant to 35 U.S.C. § 119 from Japanese Patent Application No. 2018-079548, filed on Apr. 18, 2018, the entire disclosure of which is incorporated herein by reference.

BACKGROUND

The present invention relates to a software management system, a gateway device, a maintenance device, a server device, and a control method for the software management system.

In JP-A-2010-273181, it is described that "an in-vehicle device management system capable of appropriately grasping a state of a vehicle and executing remote control according to the state is provided" and "a communication terminal installed in the vehicle executes a state checking process, collects state information, log information, software information, firmware information, hardware information, and the like from each ECU, and transmits a SIP message including the information as presence information to the server. Based on the presence information acquired from the communication terminal, the server determines whether control on each ECU is necessary and whether the control on each ECU is possible, and when the control is necessary and possible, the server transmits a SIP response including control information according to an OMA protocol to the communication terminal. The communication terminal executes response processing based on the received SIP response and executes control on the ECU."

In a vehicle such as an automobile, various electronic control devices (also referred to as Electric Control Units (ECUs)) for monitoring and controlling various equipped mechanisms are mounted. Software (firmware) stored in those electronic control devices are updated as needed (version-up, upgraded) for the purpose of improving performance, improving functions, correcting defects, and the like.

Such software updating is currently carried out by bringing in vehicles to a sales store (dealer) or a maintenance factory. However, it is necessary to smoothly update the software for many vehicles when recall or the like is carried out and, due to recent advances in driving support technology and automatic driving technology, it is expected that the type and the number of ECUs installed in a vehicle will increase in the future. For this reason, there is a problem to reliably and efficiently update the software.

In JP-A-2010-273181, it is described that software information, firmware information, and hardware information are collected from an ECU and those pieces of information are transmitted to a server. However, there are cases where parts are added or exchanged afterwards in a vehicle and, in order to reliably and efficiently update software of each ECU mounted in an unspecified number of vehicles, it is necessary for a server device to accurately grasp the latest information on the ECU mounted in the vehicle. JP-A-2010-273181 does not disclose any mechanism based on such a viewpoint.

SUMMARY

The invention is made in view of such background and is to provide a software management system, a gateway device, a maintenance device, a server device, and a control method for the software management system which can efficiently manage information on software of an electronic control device mounted in a vehicle.

In order to achieve the object described above, according to an aspect of the invention, there is provided a software management system which includes a server device, a maintenance device configured to communicate with the server device, one or more electronic control devices provided in a vehicle, a communication device provided in the vehicle and configured to communicate with the server device, and a gateway device provided in the vehicle and configured to communicate with the maintenance device, the electronic control device, and the communication device and in which the server device includes an information management unit configured to manage version information of software stored in the electronic control device in association with a control device ID which is an identifier of the electronic control device, the gateway device includes a storage unit configured to store a correspondence between the control device ID and a communication ID which is an identifier used for communication with the electronic control device, the maintenance device includes a setting processing unit configured to set the correspondence between the control device ID and the communication ID to the gateway device, and the gateway device includes a configuration information acquiring unit configured to acquire the version information by communicating with the electronic control device and a configuration information notifying unit configured to notify the server device of configuration information which is information associating the obtained version information and the control device ID through a first route via the communication device or a second route via the maintenance device.

Besides, the problem disclosed in the present description and the solving method thereof will be clarified by the description of embodiment and the drawings.

According to the invention, it is possible to efficiently manage information on software of an electronic control device mounted in a vehicle.

BRIEF DESCRIPTION OF DRAWINGS

FIG. 10 is an example of a part information TBL;

FIG. 11 is an example of an additional part information TBL;

FIG. 12 is an example of a vehicle configuration information TBL;

FIG. 13 is a diagram illustrating a hardware configuration of a maintenance device;

FIG. 14 is a diagram illustrating main functions of the maintenance device;

FIG. 21 is a sequence diagram (continued from FIG. 20) illustrating the sequence for part replacement.

DETAILED DESCRIPTION OF THE EMBODIMENTS

Figure 1:
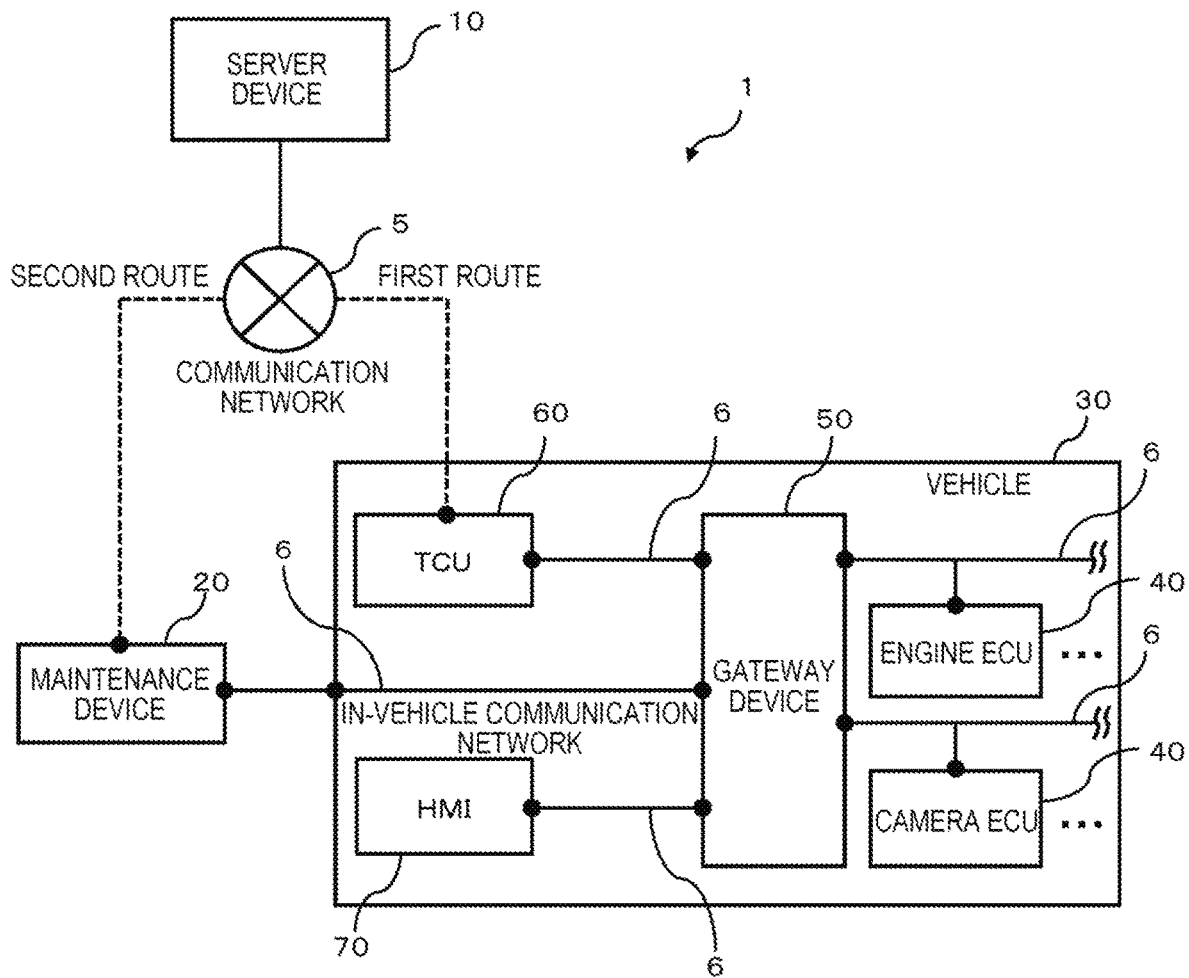
FIG. 1 is a diagram illustrating a schematic configuration of a software management system.

Hereinafter, an embodiment will be described with reference to the drawings. In the following description, the same or similar configuration will be denoted by the same reference numeral and redundant description thereof may be omitted. Also, the "Table" of the database may be referred to as "TBL".

FIG. 1 illustrates a schematic configuration of a software management system 1 described as an embodiment. As illustrated in FIG. 1, the software management system 1 includes a server device 10, a maintenance device 20, and a vehicle 30. Those devices are communicatably connected to each other via a communication network 5. The communication network 5 is, for example, a first to fifth generation mobile communication system (cellular communication, optical communication, satellite communication, or the like), the Internet, a leased line, a wireless LAN, or the like.

The server device 10 is an information processing device operated in a data center or the like by an operating entity such as a supplier of the vehicle 30, for example. The server device 10 performs collecting various types of information on the vehicle 30, providing information to other devices, managing and distributing firmware 431 of an ECU 40 described below, and the like. The vehicle 30 to be managed by the server device 10 is a vehicle waiting for shipment (delivery), a vehicle owned by a user, a vehicle under maintenance or under repair at a sales store (dealer), a factory (maintenance factory, mass production factory of an automobile manufacturer, or the like), or the like.

The maintenance device 20 is an information processing device (a laptop computer, a smartphone, a tablet, or the like) operated by a worker such as a mechanic in a sales store, a factory, or the like of the vehicle 30. The maintenance device 20 performs maintenance of the vehicle 30, diagnosis of the vehicle 30, monitoring of the condition of the vehicle 30, various settings of the vehicle 30, acquisition of various information on the vehicle 30, update of the firmware 431 of the ECU 40 described below, and the like. In some cases, the maintenance device 20 is referred to as a diagnostic tool, a maintenance tool, a maintenance terminal, or the like. The maintenance device 20 has a communication function and is communicatably connected to a gateway device 50 (to be described below) installed in the vehicle 30.

The vehicle 30 is means for transporting people and things, for example, an automobile (electric car, gasoline car, diesel car, or the like). As illustrated in FIG. 1, the vehicle 30 includes one or more electronic control devices (hereinafter referred to as the ECU 40 (ECU: Electronic Control Unit)), a gateway device 50, a communication device (hereinafter referred to as a TCU 60 (TCU: Telematics Control Unit)), and a human machine interface (hereinafter referred to as an HMI 70 (HMI: Human Machine Interface)).

The TCU 60 is communicatably connected to the server device 10 via the communication network 5 and communicates with the gateway device 50 via an in-vehicle communication network 6 described below. The TCU 60 can function as an information processing device. For example, the TCU 60 performs wireless communication with an external device when automatically reporting accident information, providing emergency assistance, providing a loading service, diagnosing the vehicle, searching regional information, acquiring traffic information and weather information, and the like. The TCU 60 includes a mounting portion of a communication card such as a SIM card (SIM: Subscriber Identity Module Card) and is capable of communicating via a mobile communication system by mounting the communication card in which regular information is written on the mounting portion. Therefore, for example, in the vehicle 30 or the like waiting for shipment before car delivery, the TCU 60 not equipped with the communication card does not function as a communication device.

The HMI 70 is a device for providing a user interface and is, for example, an operation panel, a meter panel, a display, a Head Up Display (HUD), a car navigation system, various switches, various operation levers, or the like. The HMI 70 communicates with the gateway device 50 via the in-vehicle communication network 6 described below.

Although it is omitted in FIG. 1, the vehicle 30 includes, for example, various mechanisms such as a frame, a power mechanism (engine, motor, and the like), a power transmission mechanism (transmission, tire, and the like), a suspension mechanism, a steering mechanism, a brake mechanism, an airbag mechanism, an illumination mechanism, a window control mechanism (power window, and the like), an air conditioning mechanism (car air conditioner, and the like), a locking mechanism, an audio mechanism, a navigation mechanism, an in-vehicle camera mechanism (drive recorder mechanism).

The gateway device 50, the ECU 40, the TCU 60, and the HMI 70 communicate with the gateway device 50 as a relay device via the in-vehicle communication network 6 which is a wired or wireless communication network provided in the vehicle 30. As a communication protocol used in the in-vehicle communication network 6, for example, a Controller Area Network (CAN), a Local Interconnect Network (LIN), FlexRay, a Safe-by-Wire Plus (ASRB), a Media Oriented System Transport (MOST), IDB 1394, or Ethernet (registered trademark) is exemplified.

Figure 2:
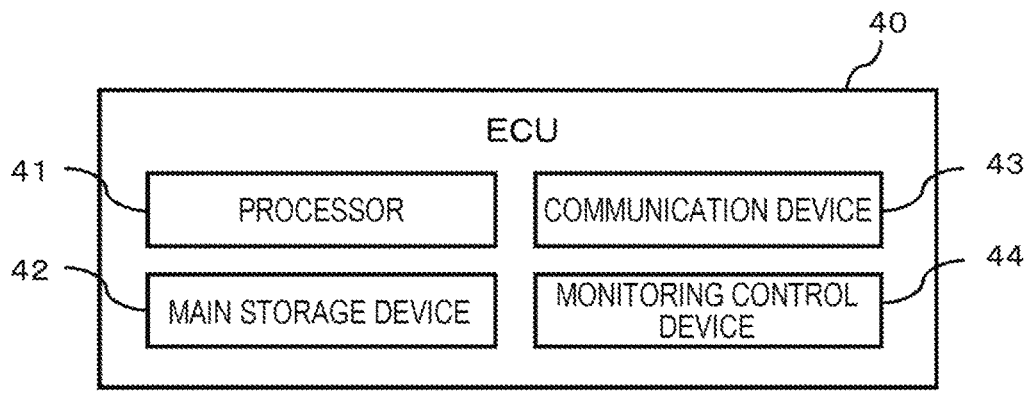
FIG. 2 is a diagram illustrating a hardware configuration of an ECU.

FIG. 2 illustrates a hardware configuration of the ECU 40. The ECU 40 monitors and controls various mechanisms (hereinafter referred to as control targets) of the vehicle 30. As illustrated in FIG. 2, the ECU 40 includes a processor 41, a main storage device 42, a communication device 43, and a monitoring control device 44. The ECU 40 may further include an auxiliary storage device such as a flash memory.

The processor 41 is constituted by using, for example, a Micro Control Unit (MCU), a Central Processing Unit (CPU), a Micro Processing Unit (MPU), a Field-Programmable Gate Array (FPGA), an Application Specific Integrated Circuit (ASIC), or the like. The main storage device 42 is, for example, a Read Only Memory (ROM) (a Static Random Access Memory (SRAM), a Non Volatile RAM (NVRAM), a Mask Read Only Memory (mask ROM), a Programmable ROM (PROM), or the like), a Random Access Memory (RAM)) (a Dynamic Random Access Memory (DRAM), or the like), or the like. The processor 41 and the main storage device 42 may be configured as an integrated package like an MCU. The main storage device 42 stores programs and data (hereinafter referred to as firmware) for realizing the functions of the ECU 40.

The communication device 43 communicates with other devices (such as the gateway device 50) of the vehicle 30 via the in-vehicle communication network 6.

The monitoring control device 44 includes circuits (for example, engine control circuit, motor control circuit, brake control circuit, and the like) for monitoring and controlling the control targets. The monitoring control device 44 passively or actively controls the control target according to the control signal from the processor 41.

Figure 3:
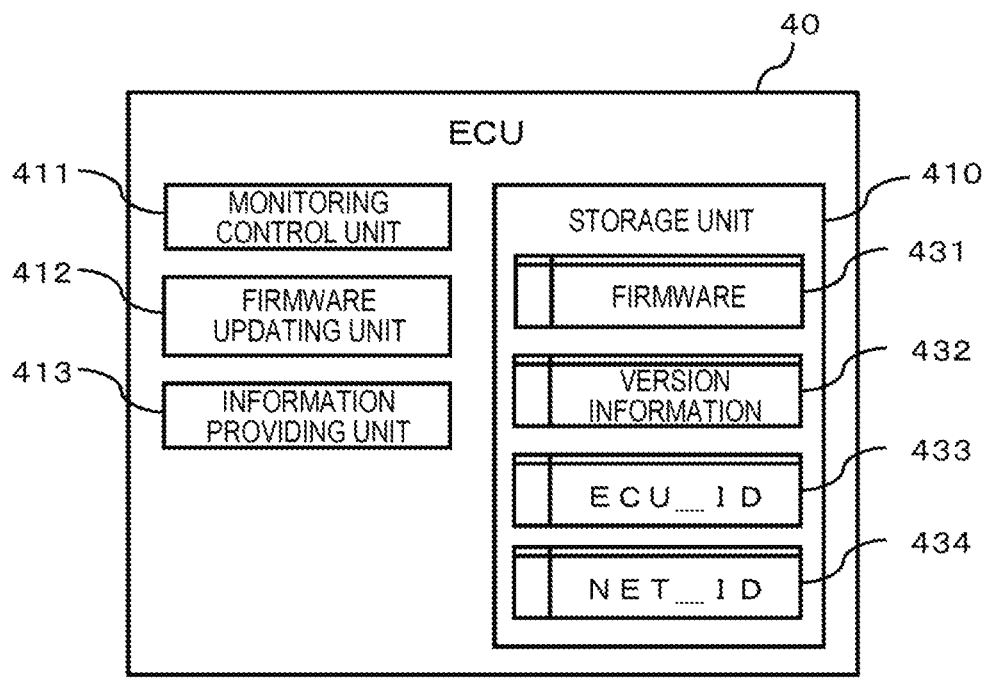
FIG. 3 is a diagram illustrating main functions of the ECU.

FIG. 3 illustrates main functions of the ECU 40. As illustrated in FIG. 3, the ECU 40 includes a storage unit 410, a monitoring control unit 411, a firmware updating unit 412, and an information providing unit 413. Those functions are realized by the processor 41 reading and executing the program stored in the main storage device 42 or by the hardware included in the ECU 40.

The storage unit 410 stores firmware 431, version information 432, ECU_ID 433, and NET_ID 434. The storage unit 410 stores those pieces of information in, for example, a rewritable nonvolatile storage area in the storage area of the main storage device 42.

The firmware 431 is software (program or data) for realizing the functions of the ECU 40. The version information 432 is information (hereinafter referred to as current version information) indicating the version of the firmware 431 currently stored in the storage unit 410. When the firmware 431 is updated, the ECU 40 also updates the version information 432.

The ECU_ID 433 is an identifier (hereinafter referred to as ECU_ID) uniquely assigned to each ECU 40. The NET_ID 434 is a unique identifier (hereinafter referred to as NET_ID) assigned to the ECU 40 in the in-vehicle communication network 6 and is information (network ID set in a header or the like of a communication packet) used by the ECU 40 to communicate with the gateway device 50 via the in-vehicle communication network 6. Values of the ECU_ID and the NET_ID are set, for example, by an automobile manufacturer.

The monitoring control unit 411 monitors and diagnoses the control target on the basis of information (sensor information, or the like) sent from the control target. Further, the monitoring control unit 411 controls the control target by inputting a control signal to the monitoring control device 44.

The firmware updating unit 412 receives various kinds of information from the server device 10 and the maintenance device 20 via the gateway device 50 and updates the information stored in the storage unit 410 such as the firmware 431 based on the received information. For example, the various kinds of information are the firmware 431, the version information 432, and the like. In addition, the various kinds of information described above may be, for example, information on new and old differences related to the information currently stored in the storage unit 410. When the firmware 431 is updated, the firmware updating unit 412 updates the version information 432 to the version information of the updated firmware 431.

The information providing unit 413 transmits information stored in the storage unit 410, information managed by the monitoring control unit 411, or the like to the gateway device 50 either passively or actively (spontaneously) in response to a request from an external device (server device 10, maintenance device 20, etc.) received via the communication device 43. Alternatively, the information providing unit 413 transmits the information stored in the storage unit 410, the information managed by the monitoring control unit 411, or the like to the server device 10 or the maintenance device 20 via the gateway device 50.

Figure 4:
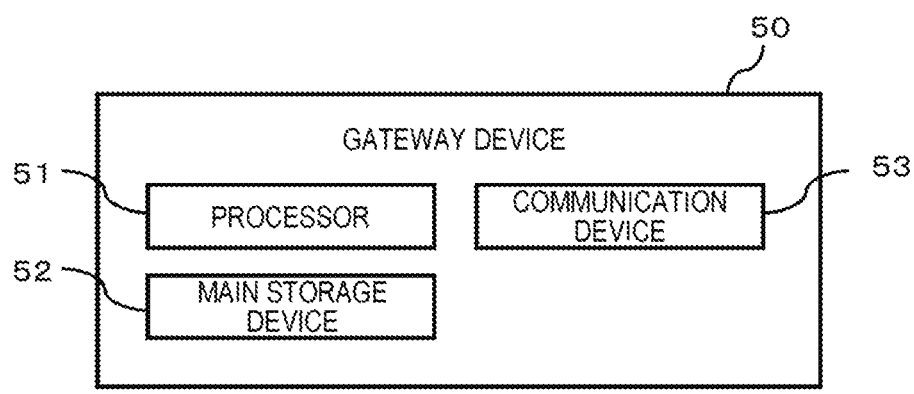
FIG. 4 is a diagram illustrating a hardware configuration of a gateway device.

FIG. 4 illustrates a hardware configuration of the gateway device 50. The gateway device 50 communicates with the maintenance device 20, the TCU 60, the HMI 70, and the ECU 40 via the in-vehicle communication network 6. As illustrated in FIG. 4, the gateway device 50 includes a processor 51, a main storage device 52, and a communication device 53.

The processor 51 is constituted by using, for example, an MCU, a CPU, an MPU, an FPGA, an ASIC, or the like. The main storage device 52 is, for example, a ROM (SRAM, or the like), NVRAM, mask ROM, PROM), or the like), a RAM (DRAM), or the like. The processor 51 and the main storage device 52 may be configured as an integrated package like an MCU. The main storage device 52 stores programs and data for realizing the functions of the gateway device 50. The gateway device 50 may function as the ECU 40, for example. The communication device 53 includes a CAN transceiver, a Network Interface Card (NIC), a wireless communication module, a Universal Serial Bus (USB) interface module, and the like.

Figures 5, 6, 7:
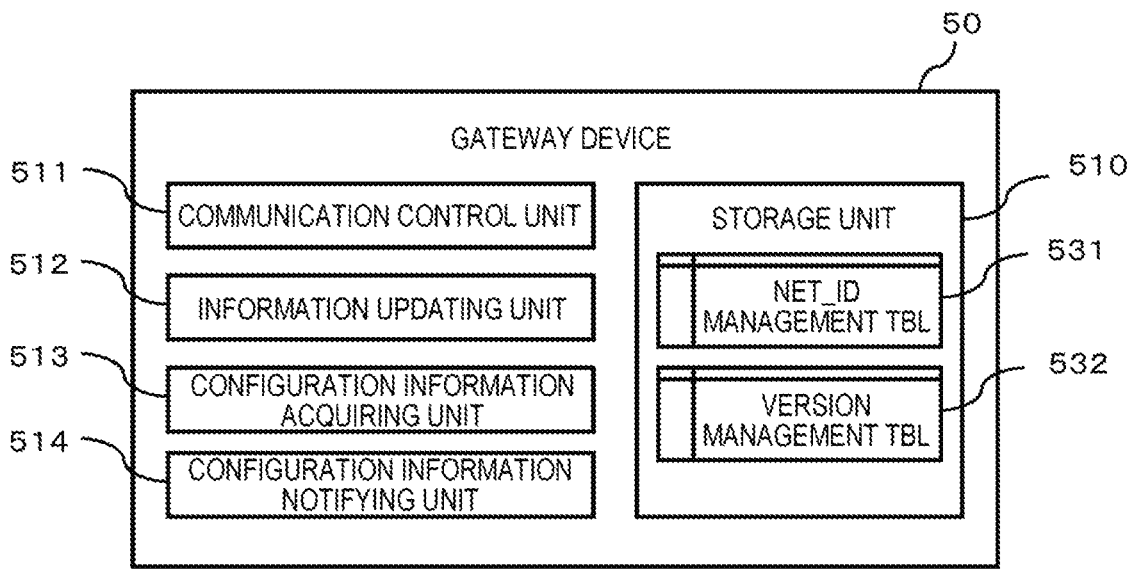
FIG. 5 is a diagram illustrating main functions of the gateway device.
FIG. 6 is an example of a NET_ID management TBL.
FIG. 7 is an example of a version management TBL.

FIG. 5 illustrates the main functions of the gateway device 50. As illustrated in FIG. 5, the gateway device 50 includes a storage unit 510, a communication control unit 511, an information updating unit 512, a configuration information acquiring unit 513, and a configuration information notifying unit 514. Those functions are realized by the processor 51 reading and executing the program stored in the main storage device 52 or by the hardware included in the gateway device 50.

The storage unit 510 stores a NET_ID management TBL 531 and a version management TBL 532.

FIG. 6 illustrates an example of the NET_ID management TBL 531. In the NET_ID management TBL 531, the NET_ID assigned to each ECU 40 is managed. As illustrated in FIG. 6, the NET_ID management TBL 531 has one or more records associating an ECU_ID and a NET_ID with each other.

FIG. 7 illustrates an example of the version management TBL 532. In the version management TBL 532, the current version information of the firmware stored in each ECU 40 is managed. As illustrated in FIG. 7, the version management TBL 532 has one or more records associating an ECU_ID 5321 with a current version information 5322.

Returning to FIG. 5, the communication control unit 511 communicates with the maintenance device 20, the TCU 60, the HMI 70, and the ECU 40 via the in-vehicle communication network 6 and relays communication performed between those devices. In the communication described above, the communication control unit 511 performs security control (encryption/decryption of communication, mutual authentication with the server device 10, communication cutoff, etc.). One of the access restriction functions of the communication control unit 511 is an access restriction function for the ECU 40. Further, with the correspondence between the ECU_ID and the NET_ID set in NET_ID management TBL 531, the communication control unit 511 is brought into a communicatable state in the in-vehicle communication network 6. The above setting is performed, for example, via the maintenance device 20 when the ECU 40 is newly installed in the vehicle 30 or when the ECU 40 is replaced.

The information updating unit 512 manages the contents of the NET_ID management TBL 531 and the version management TBL 532. For example, the information updating unit 512 accepts the correspondence between the ECU_ID and the NET_ID from the maintenance device 20 and sets the accepted correspondence described above in the NET_ID management TBL 531. Further, the information updating unit 512 acquires the current version information of the firmware 431 of the ECU 40 from the ECU 40 by communicating with the ECU 40 via the in-vehicle communication network 6 and sets the acquired current version information in the version management TBL 532 in association with the ECU_ID of the ECU 40.

The configuration information acquiring unit 513 acquires information (hereinafter also referred to as configuration information) regarding the ECU 40 mounted in the vehicle 30, such as current version information, from the ECU 40.

The configuration information notifying unit 514 notifies to the server device 10 of the configuration information acquired from the ECU 40 via a route (first route) via the TCU 60 or a route (second route) via the maintenance device 20.

Figure 8:
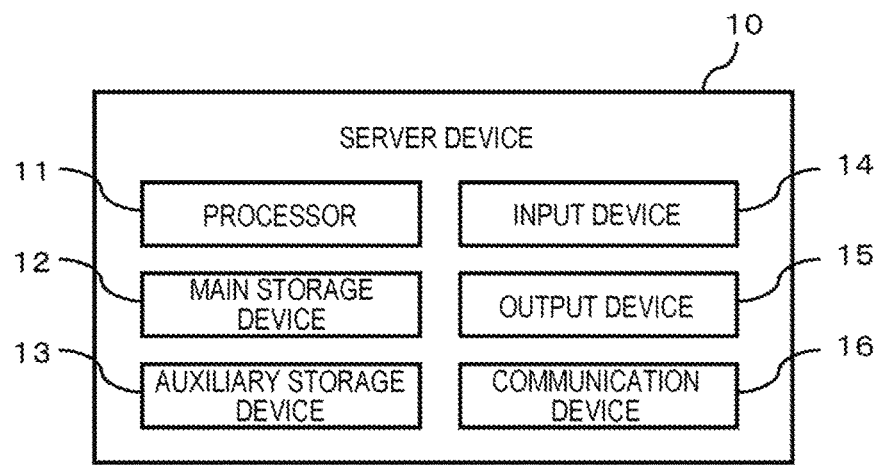
FIG. 8 is a diagram illustrating a hardware configuration of a server device.

FIG. 8 illustrates the hardware configuration of the server device 10. As illustrated in FIG. 8, the server device 10 includes a processor 11, a main storage device 12, an auxiliary storage device 13, an input device 14, an output device 15, and a communication device 16 and functions as an information processing device (computer). Further, the server device 10 may be realized by using a virtual information processing resource such as a cloud server of which the entire or a part of the functions are provided by the cloud system. In addition, the server device 10 may be realized by, for example, a plurality of information processing devices communicatably connected to each other which are operated in cooperation with each other.

The processor 11 is constituted by using, for example, a CPU or an MPU. The main storage device 12 is a device for storing programs and data and is, for example, a ROM (SRAM, or the like), NVRAM, mask ROM, PROM, or the like), a RAM (DRAM or the like), or the like.

The auxiliary storage device 13 is a hard disk drive, a flash memory, an SSD, an optical storage device (CD, DVD, BD, or the like), or the like. The programs and data stored in the auxiliary storage device 13 are loaded into the main storage device 12 at any time.

The input device 14 is a user interface which accepts input of information from a user and is, for example, a keyboard, a mouse, a card reader, a touch panel, or the like. The output device 15 is a user interface which provides information to the user and is, for example, a display device (Liquid Crystal Display (LCD), graphic card, or the like) for visualizing various kinds of information, an audio output device (speaker), a printing device, or the like. The communication device 16 is a communication interface which communicates with other devices via the communication network 5 and is, for example, an NIC, a wireless communication module, or the like.

Figure 9:
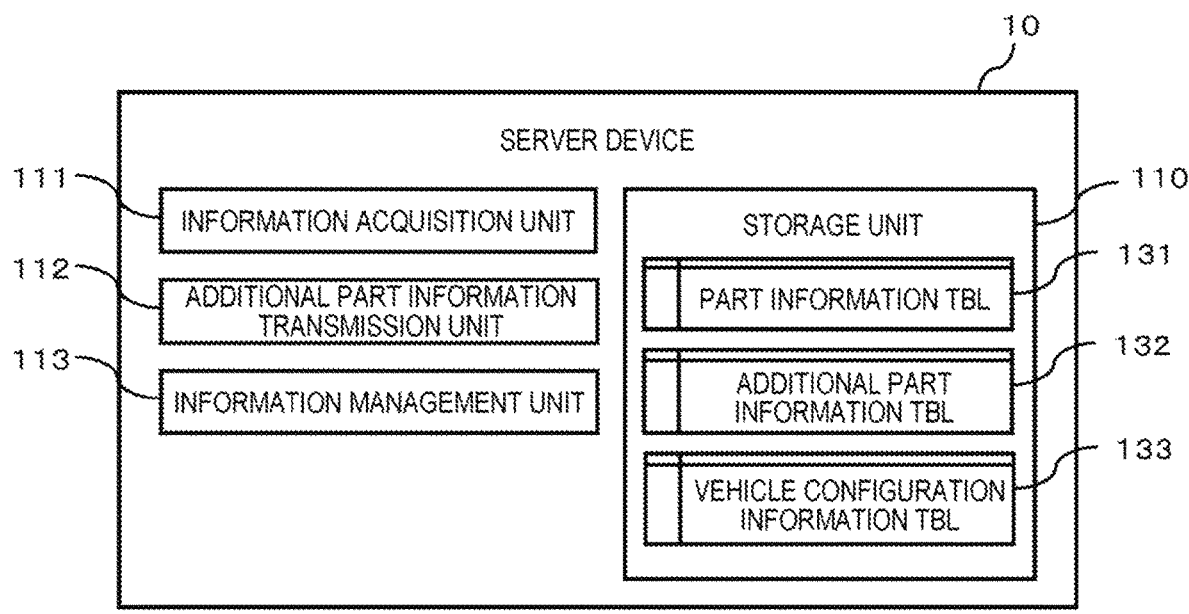
FIG. 9 is a diagram illustrating main functions of the server device.

FIG. 9 illustrates main functions (software configuration) of the server device 10. As illustrated in FIG. 9, the server device 10 has functions of a storage unit 110, an information acquisition unit 111, an additional part information transmission unit 112, and an information management unit 113. Those functions are realized by the processor 11 reading and executing the program stored in the main storage device 12. Further, in addition to the functions described above, the server device 10 may have other functions such as an operating system, a file system, a device driver, a Data Base Management System (DBMS), and the like. The server device 10 stores information (data) stored in the storage unit 110, for example, as a database table or a file.

As illustrated in FIG. 9, the storage unit 110 stores a part information TBL 131, an additional part information TBL 132, and a vehicle configuration information TBL 133.

FIG. 10 illustrates an example of the part information TBL 131. Basic information (hereinafter referred to as part information) on the ECU 40 such as specifications of the ECU 40 is managed in the part information TBL 131. The part information TBL 131 is managed by, for example, the supplier of the ECU 40. One record of the part information TBL 131 corresponds to one part (one ECU 40 or one part having ECU 40).

As illustrated in FIG. 10, the part information TBL 131 includes one or more records having items of an ECU_ID 1311, an ECU type 1312, an option flag 1313, an application vehicle type ID 1314, a NET_ID 1315, and a latest version 1316.

The ECU_ID assigned to the ECU 40 is set in the ECU_ID 1311. In the ECU type 1312, the information (hereinafter referred to as an ECU type) indicating the type of the ECU 40 is set.

In the option flag 1313, information (hereinafter referred to as an option flag) indicating whether the ECU 40 is an ECU 40 (hereinafter referred to as an attached ECU) attached to apart such as an optional part is set. In the option flag 1313, "True" is set when the ECU 40 is an attached ECU and "False" is set when the ECU 40 is not an attached ECU. In the application vehicle type ID 1314, information (hereinafter referred to as a vehicle type ID) indicating the type of the vehicle 30 on which the ECU 40 can be mounted is set.

In the NET_ID 1315, the NET_ID set for the ECU 40 when the ECU 40 is mounted in the vehicle 30 is set. In this way, in the ECU 40, the NET_ID used by the ECU 40 in the in-vehicle communication network 6 is specified in advance.

In the latest version 1316, version information of the latest firmware 431 (hereinafter referred to as a latest version information) released from a supplier or the like for the ECU 40 is set.

FIG. 11 illustrates an example of the additional part information TBL 132. The additional part information TBL 132 manages information (hereinafter referred to as additional part information) on the ECU or the attached ECU added to the vehicle 30. The content of the additional part information TBL 132 is set by, for example, the operating entity of the server device 10. Further, in some cases, the contents of the additional part information TBL 132 may be set by, for example, a worker of a sales store or a factory via the maintenance device 20 and the communication network 5. One record of the additional part information TBL 132 corresponds to one ECU or one attached ECU.

As illustrated in FIG. 11, the additional part information TBL 132 includes one or more records having items such as an ECU_ID 1321, a vehicle ID 1322, an application location 1323, a configuration information synchronization route 1324, and a NET_ID 1325.

In the ECU_ID 1321, the ECU_ID of the ECU or the attached ECU is set. In the vehicle ID 1322, an identifier (for example, a vehicle identification number such as a Vehicle Identification Number (VIN). Hereinafter, referred to as a vehicle ID) of the vehicle 30 to which the ECU or the attached ECU is added is set. In the application location 1323, information (sales store, factory, or the like) indicating the location (hereinafter referred to as an application location) where the ECU or the attached ECU has been added is set.

In the configuration information synchronization route 1324, a route (information indicating whether to acquire via the TCU 60 (first route) or via the maintenance device 20 (second route). Hereinafter, referred to as a configuration information synchronization route) for acquiring information (hereinafter referred to as update information) used for updating the vehicle configuration information TBL 133 of the server device 10 from the vehicle 30 is set. In the NET_ID 1325, the NET_ID assigned to the ECU or the attached ECU in the in-vehicle communication network 6 is set.

FIG. 12 illustrates an example of the vehicle configuration information TBL 133. In the vehicle configuration information TBL 133, the configuration information of the ECU 40 mounted in each vehicle 30 is managed. The contents of the vehicle configuration information TBL 133 are set based on configuration information acquired from the part information TBL 131, the additional part information TBL 132, and the vehicle 30 by the server device 10.

As illustrated in FIG. 12, the vehicle configuration information TBL 133 includes one or more records having items of a vehicle ID 1331, a vehicle type ID 1332, an ECU type 1333, an ECU_ID 1334, and a current version information 1335. One record of the vehicle configuration information TBL 133 corresponds to one vehicle 30. In vehicle ID 1331, the vehicle ID of the vehicle 30 is set. In the vehicle type ID 1332, the vehicle type ID of the vehicle 30 is set. In the ECU type 1333, the ECU type of the ECU 40 mounted in the vehicle 30 is set. In the ECU_ID, the ECU_ID of the ECU 40 mounted in the vehicle 30 is set. In the current version information 1335, the current version information of the firmware 431 currently stored in the ECU 40 mounted in the vehicle 30 is set.

Returning to FIG. 9, the information acquisition unit 111 receives the configuration information from the gateway device 50. When the ECU 40 is added to the vehicle 30, the additional part information transmission unit 112 transmits an additional part information 231 described below to the maintenance device 20. The information management unit 113 manages the vehicle configuration information TBL 133 based on the configuration information received by the information acquisition unit 111.

FIG. 13 illustrates the hardware configuration of the maintenance device 20. As illustrated in FIG. 13, the maintenance device 20 includes a processor 21, a main storage device 22, an auxiliary storage device 23, an input device 24, an output device 25, and a communication device 26 and functions as an information processing device (computer).

The processor 21 is constituted by using, for example, a CPU or an MPU. The main storage device 22 is a device for storing programs and data and is, for example, a ROM (SRAM, or the like), an NVRAM, a mask ROM, a PROM, or the like), a RAM (DRAM or the like), or the like. The auxiliary storage device 23 is a hard disk drive, a flash memory, an SSD, an optical storage device (CD, DVD, etc.), or the like. Programs and data stored in the auxiliary storage device 23 are loaded into the main storage device 22 at any time.

The input device 24 is a user interface which accepts input of information from a user and is, for example, a keyboard, a mouse, a touch panel, or the like. The output device 25 is a user interface for providing information to a user and is, for example, a display device (LCD, graphic card, or the like) for visualizing various kinds of information, an audio output device (speaker), or the like. The communication device 26 is a communication interface which communicates with other devices via the communication network 5 and is, for example, an NIC, a wireless communication module, a USB module, a serial communication module, or the like.

FIG. 14 illustrates the main functions (software configuration) of the maintenance device 20. As illustrated in FIG. 14, the maintenance device 20 has functions of a storage unit 210, an information management unit 211, a setting processing unit 212, a configuration information acquiring unit 213, and a configuration information notifying unit 214. Those functions are realized by the processor 21 reading and executing the program stored in the main storage device 22. Further, in addition to the functions described above, the maintenance device 20 may have other functions such as an operating system, a file system, a device driver, a DBMS, or the like. The maintenance device 20 stores information (data) stored by the storage unit 210, for example, as a database table or file.

The storage unit 210 stores the additional part information 231 and configuration information 232. Details of the additional part information 231 and the configuration information 232 will be described below.

The information management unit 211 receives the additional part information 231 from the server device 10 and stores the received additional part information 231. Further, the storage unit 210 may store the additional part information 231 in advance (for example, when a worker at a sales store, a factory, or the like sets the additional part information 231 using the maintenance device 20, or the like).

The setting processing unit 212 communicates with the gateway device 50 via the in-vehicle communication network 6 and transmits an update request of the NET_ID management TBL 531 stored in the gateway device 50.

The configuration information acquiring unit 213 communicates with the gateway device 50 via the in-vehicle communication network 6 and acquires the current version information of the firmware 431 stored in the ECU 40.

The configuration information notifying unit 214 notifies to the server device 10 of the configuration information including the current version information of the firmware 431 stored in the ECU 40 via the communication network 5.

Subsequently, in the software management system 1 having the configuration described above, a process (hereinafter referred to as a vehicle configuration information update sequence S1500) performed when an ECU or an attached ECU is added to vehicle 30 and the vehicle configuration information TBL 133 managed by the server device 10 is updated will be described.

Figure 15:
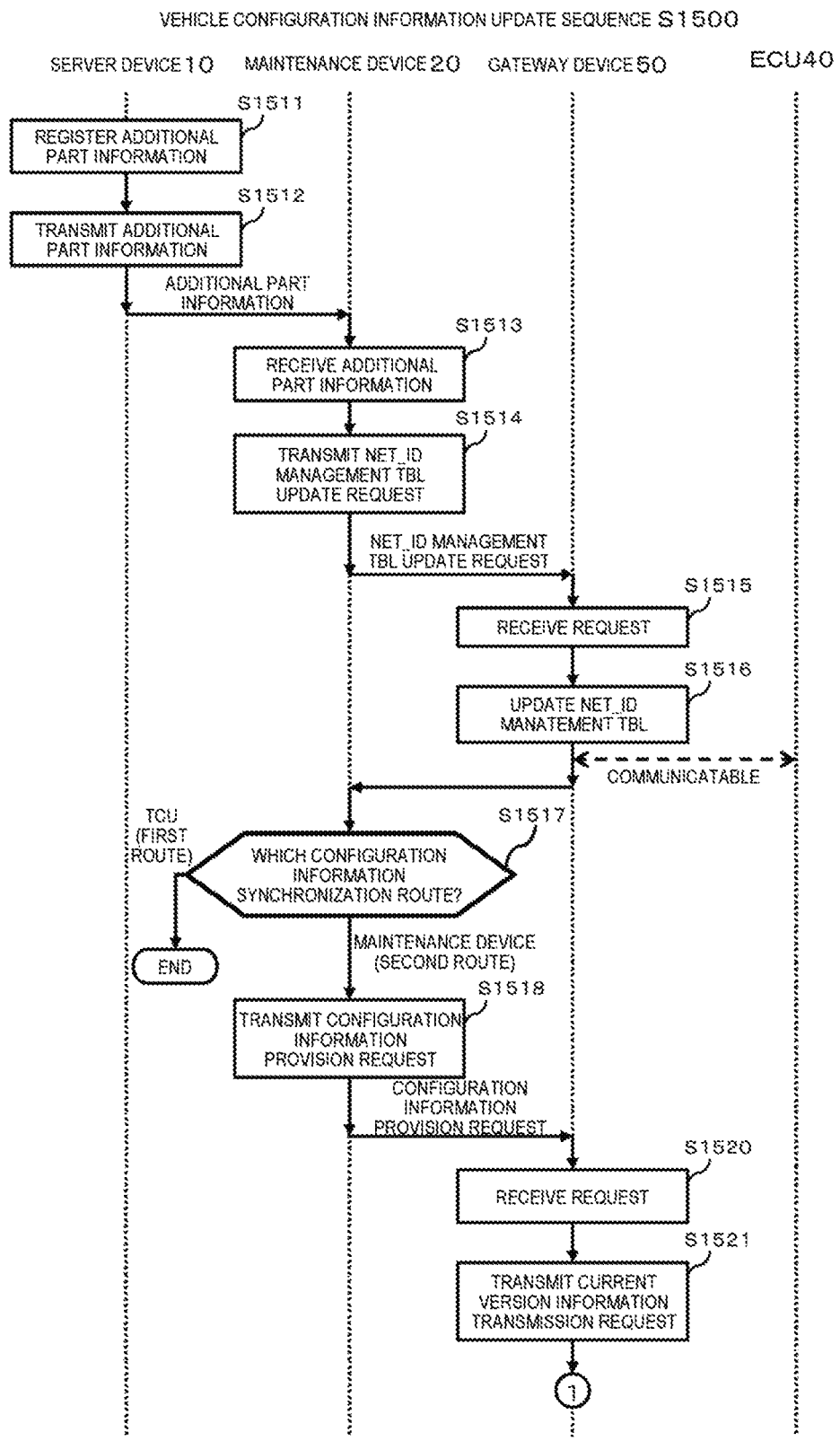
FIG. 15 is a sequence diagram illustrating a vehicle configuration information update sequence.
Figure 16:
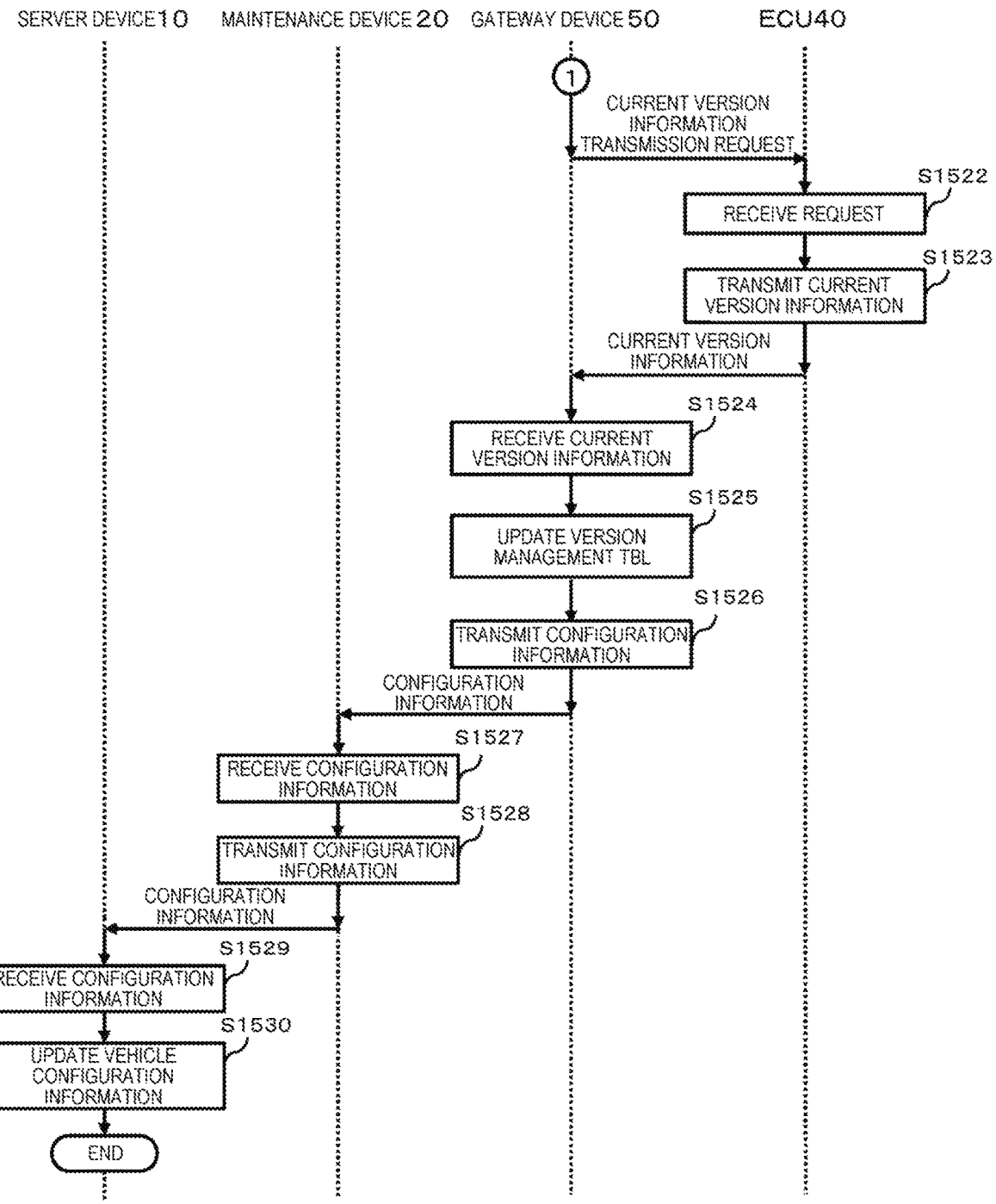
FIG. 16 is a sequence diagram (continued from FIG. 15) illustrating the vehicle configuration information update sequence.

FIGS. 15 and 16 are diagrams illustrating the vehicle configuration information update sequence S1500. FIG. 16 is continuous with the sequence diagram of FIG. 15. Hereinafter, the vehicle configuration information update sequence S1500 will be described with reference to those drawings.

As illustrated in FIG. 15, first, the server device 10 adds (registers) the additional part information to the additional part information TBL 132 (S1511). The server device 10 may accept the additional part information to be added to the additional part information TBL 132 via, for example, a user interface provided in the server device 10 or may accept the information from the maintenance device 20 via the communication network 5.

Next, the server device 10 starts a process for acquiring the configuration information including the current version information from the ECU 40. First, the server device 10 transmits the additional part information added to the additional part information TBL 132 in S1511 to the maintenance device 20 via the communication network 5 (S1512).

Figure 17:
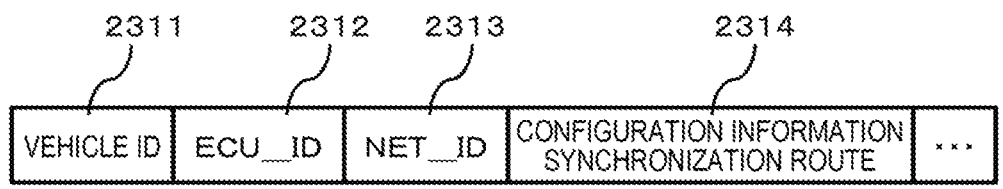
FIG. 17 is a diagram illustrating a data configuration of the additional part information transmitted from the server device to the maintenance device.

FIG. 17 illustrates an example of the additional part information 231. As illustrated in FIG. 17, the additional part information 231 includes information such as a vehicle ID 2311, an ECU_ID 2312, a NET_ID 2313, a configuration information synchronization route 2314, and the like. The additional part information 231 is generated based on the additional part information TBL 132 of the server device 10.

Returning to FIG. 15, when the additional part information 231 is received (S1513), the maintenance device 20 transmits an update request of the NET_ID management TBL 531 together with the received additional part information 231 to the gateway device 50 (S1514).

When the update request is received (S1515), the gateway device 50 updates the NET_ID management TBL 531 based on the additional part information 231 received together with the update request. Specifically, a combination of the ECU_ID and the NET_ID included in the additional part information 231 is added (registered) to the NET_ID management TBL 531 (S1516). As a result, the gateway device 50 brought into a communicable state via the in-vehicle communication network 6 with the ECU 40 of which the configuration information is intended to be acquired.

Next, the maintenance device 20 determines the content of the configuration information synchronization route 2314 of the additional part information 231 (S1517). When the content of the configuration information synchronization route 2314 is "TCU" (S1517: TCU (first route)), the maintenance device 20 terminates the process. In this case, the server device 10 acquires the configuration information from the gateway device 50 via the communication network 5 and the TCU 60 and updates the vehicle configuration information TBL 133.

On the contrary, when the content of the configuration information synchronization route 2314 is "maintenance device" (S1517: maintenance device (second route)), the maintenance device 20 transmits a configuration information provision request to the gateway device 50 (S1518).

Figure 18:
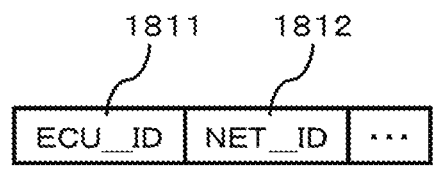
FIG. 18 is a diagram illustrating a data configuration of a configuration information provision request transmitted from the maintenance device to the gateway device.

FIG. 18 illustrates an example of the provision request (hereinafter referred to as a configuration information provision request 1800). As illustrated in FIG. 18, the configuration information provision request 1800 includes information such as an ECU_ID 1811 and a NET_ID 1812. In ECU_ID 1811, the ECU_ID assigned to the ECU 40 of which the configuration information is intended to be acquired is set. In the NET_ID 1812, the NET_ID assigned to the ECU 40 of which the configuration information is intended to be acquired is set.

Returning to FIG. 15, when the configuration information provision request 1800 is received (S1520), the gateway device 50 transmits a transmission request of the current version information (the contents of the version information 432 stored by the ECU 40) to the ECU 40 (S1521).

In S1522 of FIG. 16, when the transmission request is received, the ECU 40 transmits the current version information to the gateway device 50 (S1523).

When the current version information is received from the ECU 40 (S1524), the gateway device 50 updates the contents of the version management TBL 532 to the received current version information (S1525). As a result, the content of the version management TBL 532 managed by the gateway device 50 matches the version information of the firmware 431 stored in the present ECU 40.

Next, the gateway device 50 generates the configuration information 232 including the current version information and transmits the information to the maintenance device 20 (S1526).

Figure 19:
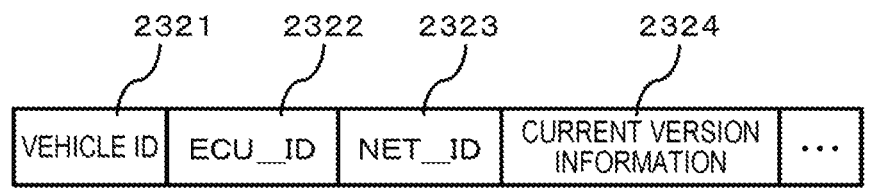
FIG. 19 is a diagram illustrating a data configuration of configuration information transmitted from the gateway device to the maintenance device.

FIG. 19 illustrates an example of the configuration information 232. As illustrated in FIG. 19, the configuration information 232 includes information such as a vehicle ID 2321, an ECU_ID 2322, a NET_ID 2323, a current version information 2324, and the like.

Returning to FIG. 16, when the configuration information 232 is received (S1527), the maintenance device 20 transmits the contents of the received configuration information 232 to the server device 10 (S1528).

When the contents of the configuration information 232 is received (S1529), the server device 10 updates the vehicle configuration information TBL 133 based on the contents of the received configuration information (S1530).

According to the vehicle configuration information update sequence S1500 described above, when the ECU or the attached ECU is added to the vehicle 30, the contents of the vehicle configuration information TBL 133 of the server device 10 is automatically updated to the latest information (current version information) of the firmware 431 stored in the ECU 40 of the vehicle 30. Therefore, the latest accurate configuration information can be efficiently and rapidly acquired in the server device 10.

Incidentally, the vehicle configuration information update sequence S1500 described above is started when the additional part information 231 is transmitted from the server device 10 to the maintenance device 20. However, as another method, when apart (ECU or attached ECU) mounted in the vehicle 30 is replaced, the gateway device 50 may acquire the configuration information including the current version information from the ECU 40 and notify the server device 10 of the information, and then the server device 10 may update the vehicle configuration information TBL 133. Hereinafter, the process (hereinafter referred to as a part replacement sequence S2000) performed in the software management system 1 in implementing the method will be described.

Figure 20:
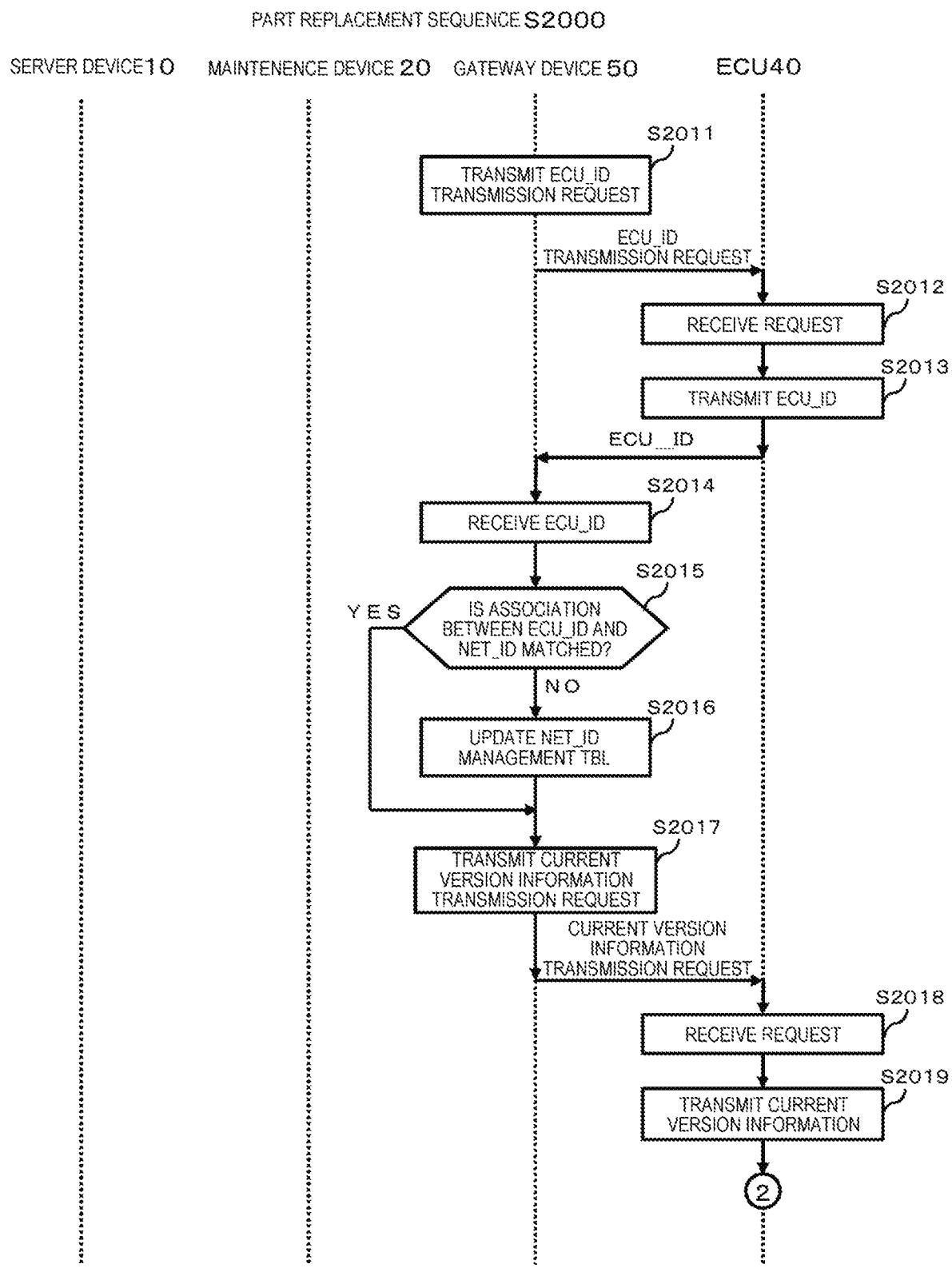
FIG. 20 is a sequence diagram illustrating a sequence for parts replacement.

FIGS. 20 and 21 are diagrams illustrating the part replacement sequence S2000. Hereinafter, the part replacement sequence S2000 will be described with reference to the drawings. The part replacement sequence S2000 is started when, for example, the gateway device 50 detects exchange of the ECU 40 mounted in the vehicle 30.

As illustrated in FIG. 20, first, the gateway device 50 transmits a transmission request (inquiry) of the ECU_ID to the ECU 40 using one of the NET_IDs registered in the NET_ID management TBL 531 as a destination (S2011). When the transmission request of the ECU_ID is received (S2012), the ECU 40 transmits the stored ECU_ID (contents of the ECU_ID 433) to the gateway device 50 (S2013).

When the ECU_ID is received from the ECU 40 (S2014), the gateway device 50 determines whether the ECU_ID corresponding to the NET_ID of the destination registered in the NET_ID management TBL 531 matches the ECU_ID received from the ECU 40 (S2015). When the two match (S2015: YES), the process proceeds to S2017.

On the other hand, when the two do not match (S2015: NO), the process proceeds to S2016. In S2016, the gateway device 50 associates the ECU_ID received from the ECU 40 with the NET_ID of the destination registered in the NET_ID management TBL 531. As a result, the content of the NET_ID management TBL 531 is updated to the latest content.

In this way, the gateway device 50 confirms whether the correspondence between the ECU_ID and the NET_ID registered in the NET_ID management TBL 531 is the latest state, and when the correspondence is not in the latest state, the gateway device 50 updates the contents of the NET_ID management TBL 531 to the latest state. The processes of S2011 to S2016 may be repeatedly executed for each of the NET_IDs registered in the NET_ID management TBL 531 in order.

In S2017, the gateway device 50 transmits a transmission request of the current version information (content of version information 432 stored in ECU 40) to the ECU 40. When the transmission request is received (S2018), the ECU 40 transmits the current version information (content of version information 432) to the gateway device 50 (S2019).

In S2020 of FIG. 21, the gateway device 50 receives the current version information from the ECU 40. Then, the gateway device 50 updates the content of the version management TBL 532 with the received current version information (S2021). As a result, the content of the version management TBL 532 managed by the gateway device 50 matches the version information of the firmware 431 stored in the present ECU 40.

Next, the gateway device 50 transmits the configuration information 232 including the current version information to the maintenance device 20 (S2022).

When the configuration information 232 is received (S2023), the maintenance device 20 transmits the received configuration information 232 to the server device 10 (S2024).

When the configuration information 232 is received (S2025), the server device 10 updates the vehicle configuration information TBL 133 based on the contents of the received configuration information (S2026).

The processes of S2017 to S2026 may be executed only when the ECU_ID corresponding to the NET_ID of the destination registered in the NET_ID management TBL 531 does not match the ECU_ID received from the ECU 40 (S2015: NO).

According to the part replacement sequence S2000, when apart (ECU or attached ECU) mounted in the vehicle 30 are replaced, the content of the NET_ID management TBL 531 of the gateway device 50 is automatically updated to the latest content. Also, the content of the vehicle configuration information TBL 133 of the server device 10 is automatically updated to the information of the firmware 431 stored in the ECU 40 of the vehicle 30. Therefore, the latest accurate configuration information can be efficiently and rapidly acquired in the server device 10.

Hereinbefore, the invention is specifically described based on the embodiment. However, it is needless to say that the invention is not limited to the embodiment described above and various modifications can be made without departing from the gist thereof. For example, the embodiment described above is described in detail in order to explain the invention in an easy-to-understand manner and is not necessarily limited to those having all the configurations described. Further, it is possible to add, delete, or replace other components with respect to part of the configuration of the embodiment described above.

For example, the vehicle 30 is not necessarily limited to a car and may be another transportation means such as a motorcycle. Also, the transportation means is not limited to land transportation means and may be transportation means such as water transportation means, underwater transportation means, aerial transportation means (for example, a ship, an aircraft, or the like).

Further, each of the above-described configuration, functional unit, processing unit, processing means, and the like may be realized by hardware, for example, by designing part or all of them with an integrated circuit or the like. Further, each of the above-described configurations, functions, and the like may be realized by software by interpreting and executing programs which realize the respective functions by the processor. Information such as programs, tables, files, and the like which realize respective functions can be stored in a recording device such as a memory, a hard disk, a Solid State Drive (SSD) or recording medium such as an IC card, an SD card, or a DVD.

In each of the drawings described above, the control line and the information line indicate what is considered to be necessary for the explanation and do not necessarily indicate all the control lines and information lines on the mounting. For example, it may be considered that almost all the configurations are actually connected to one another.

Also, the arrangement of various functional units, various processing units, and various databases in the software management system 1 described above is only an example. The arrangement of the various functional units, the various processing units, and the various databases can be changed to an optimum arrangement from the viewpoints of hardware and software performance, processing efficiency, communication efficiency, and the like in the software management system 1.

Further, the configurations (schema or the like) of the various databases described above can be flexibly changed from the viewpoint of efficient utilization of resources, improvement of processing efficiency, improvement of access efficiency, improvement of search efficiency, and the like.

What is claimed is:

1. A software management system comprising:
a server device;
a maintenance device configured to communicate with the server device;
one or more electronic control devices provided in a vehicle;
a communication device provided in the vehicle and configured to communicate with the server device; and
a gateway device provided in the vehicle and configured to communicate with the maintenance device, the one or more electronic control devices, and the communication device, wherein
the server device includes an information management unit configured to manage version information of software stored in an electronic control device of the one or more electronic control devices in association with a control device ID which is an identifier of the electronic control device,
the gateway device includes a storage unit which stores a correspondence between the control device ID and a communication ID which is an identifier used for communication with the electronic control device,
the maintenance device includes a setting processing unit configured to set a correspondence between the control device ID and the communication ID to the gateway device, and
the gateway device includes a configuration information acquiring unit configured to acquire the version information by communicating with the electronic control device and a configuration information notifying unit configured to notify the server device of configuration information which is information associating the obtained version information and the control device ID through a first route via the communication device or a second route via the maintenance device, wherein the server device includes an additional part information transmission unit configured to, when the electronic control device is added to the vehicle, transmit to the maintenance device, additional part information which is information where the control device ID and the communication ID are associated to the maintenance device, the setting processing unit of the maintenance device is configured to, when the additional part information is received from the server device, perform a setting process of setting, on the gateway device, the correspondence between the control device ID and the communication ID in the received additional part information, the additional part information includes a configuration information synchronization route which is information for specifying a route for notifying the server device of the configuration information, wherein the configuration information synchronization route indicates whether the route for notifying the server device of the configuration information is via the communication device or via the maintenance device, the setting processing unit of the maintenance device is configured to, upon determining the configuration information synchronization route indicates that the route for notifying the server device of the configuration information is via the maintenance device, transmit a configuration information provision request to the gateway device, and the configuration information notifying unit of the gateway device is configured to determine which one of the first route and the second route to notify the server device of the configuration information depending on whether the configuration information provision request is received from the maintenance device or not, wherein the configuration information notifying unit notifies the server device based on the determination between the first route and the second route.

2. A gateway device which is the gateway device in the software management system of claim 1, comprising:

the storage unit configured to store a correspondence between the control device ID and a communication ID which is an identifier used for communication with the electronic control device;

the configuration information acquiring unit configured to acquire the version information by communicating with the electronic control device; and the configuration information notifying unit configured to notify the server device of configuration information which is information associating the obtained version information and the control device ID through the first route via the communication device or the second route via the maintenance device.

3. A maintenance device which is the maintenance device in the software management system of claim 1, comprising:

the setting processing unit configured to set the correspondence between the control device ID and the communication ID to the gateway device.

4. A maintenance device which is the maintenance device in the software management system of claim 1, wherein when the additional part information is received, the setting processing unit performs a setting process of correspondence between the control device ID and the communication ID in the received additional part information on the gateway device.

5. A server device which is the server device in the software management system of claim 1, comprising:

the additional part information transmission unit configured to transmit the additional part information which is information where the control device ID and the communication ID are associated to the maintenance device when the electronic control device is added to the vehicle;

an information acquisition unit configured to receive the configuration information sent from the gateway device; and the information management unit configured to manage version information of software stored in the electronic control device in association with a control device ID which is an identifier of the electronic control device based on the configuration information.

6. The software management system of claim 1, wherein the gateway device further includes a communication control unit configured to control communication with the electronic control device based on correspondence between the control device ID and the communication ID stored in the storage unit.

7. A gateway device which is the gateway device in the software management system of claim 6, comprising:

the storage unit configured to store a correspondence between the control device ID and a communication ID which is an identifier used for communication with the electronic control device;

the configuration information acquiring unit configured to acquire the version information by communicating with the electronic control device;

the configuration information notifying unit configured to notify the server device of configuration information which is information associating the obtained version information and the control device ID through the first route via the communication device or the second route via the maintenance device; and the communication control unit configured to control communication with the electronic control device based on a correspondence between the control device ID and the communication ID stored in the storage unit.

8. The software management system of claim 1, wherein the gateway device further includes an information updating unit configured to transmit a transmission request of the control device ID to the electronic control device having the communication ID stored in the storage unit, receive the control device ID as a response to the transmission request, determine whether the received control device ID matches the control device ID stored in association with the communication ID stored in the storage unit, and store the communication ID in association with the received control device ID when the IDs do not match.

9. A gateway device which is the gateway device in the software management system of claim 8, comprising:

the storage unit configured to store a correspondence between the control device ID and a communication ID which is an identifier used for communication with the electronic control device;

the configuration information acquiring unit configured to acquire the version information by communicating with the electronic control device;

the configuration information notifying unit configured to notify the server device of configuration information which is information associating the obtained version information and the control device ID through the first route via the communication device or the second route via the maintenance device; and the information updating unit configured to transmit a transmission request of the control device ID to the electronic control device having the communication ID stored in the storage unit, receive the control device ID as a response to the transmission request, determine whether the received control device ID matches the control device ID stored in association with the communication ID stored in the storage unit, and store the communication ID in association with the received control device ID when the IDs do not match.

10. A control method for a software management system including a server device, a maintenance device configured to communicate with the server device, one or more electronic control devices provided in a vehicle, a communication device provided in the vehicle and configured to communicate with the server device, and a gateway device provided in the vehicle and configured to communicate with the maintenance device, the one or more electronic control devices, and the communication device, the method comprising:

causing the server device to manage version information of software stored in an electronic control device of the one or more electronic control devices in association with a control device ID which is an identifier of the electronic control device;

causing the gateway device to store a correspondence between the control device ID and a communication ID which is an identifier used for communication with the electronic control device;

causing the maintenance device to set a correspondence between the control device ID and the communication ID to the gateway device;

causing the gateway device to acquire the version information by communicating with the electronic control device, and to notify the server device of configuration information which is information associating the obtained version information and the control device ID through a first route via the communication device or a second route via the maintenance device when the electronic control device is added to the vehicle, transmitting, by the server device, to the maintenance device, additional part information which is information where the control device ID and the communication ID are associated to the maintenance device; and when the additional part information is received from the server device, performing a setting process of setting, on the gateway device, the correspondence between the control device ID and the communication ID in the received additional part information;

wherein the additional part information includes a configuration information synchronization route which is information for specifying a route for notifying the server device of the configuration information, wherein the configuration information synchronization route indicates whether the route for notifying the server device of the configuration information is via the communication device or via the maintenance device, wherein the maintenance device is configured to, upon determining the configuration information synchronization route indicates that the route for notifying the server device of the configuration information is via the maintenance device, transmit a configuration information provision request to the gateway device, and wherein the gateway device is configured to determine which one of the first route and the second route to notify the server device of the configuration information depending on whether the configuration information provision request is received from the maintenance device or not, wherein the gateway device notifies the server device based on the determination between the first route and the second route.

11. The control method for a software management system of claim 10, further comprising:

causing the gateway device to transmit a transmission request of the control device ID to the electronic control device having the stored communication ID, to receive the control device ID as a response to the transmission request, to determine whether the received control device ID matches the control device ID stored in association with the stored communication ID, and to store the communication device ID in association with the received control device ID when the IDs do not match.

* * * * *